(12) United States Patent
Nakagawa et al.

(10) Patent No.: US 9,051,973 B2
(45) Date of Patent: Jun. 9, 2015

(54) SHAFT COUPLING MECHANISM

(71) Applicant: Oiles Corporation, Tokyo (JP)

(72) Inventors: Noboru Nakagawa, Kanagawa (JP); Hiroshi Ohashi, Aichi (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/085,130

(22) Filed: Nov. 20, 2013

(65) Prior Publication Data

US 2014/0080610 A1 Mar. 20, 2014

Related U.S. Application Data

(62) Division of application No. 13/518,968, filed as application No. PCT/JP2010/007291 on Dec. 15, 2010, now Pat. No. 8,616,986.

(30) Foreign Application Priority Data

Dec. 25, 2009 (JP) ................................. 2009-296416

(51) Int. Cl.
*F16D 3/68* (2006.01)
*F16D 3/10* (2006.01)
*F16D 3/12* (2006.01)
*B62D 5/04* (2006.01)

(52) U.S. Cl.
CPC ................ *F16D 3/12* (2013.01); *B62D 5/0409* (2013.01); *F16D 3/68* (2013.01)

(58) Field of Classification Search
USPC ............................ 464/73, 76, 85, 93–95, 157
See application file for complete search history.

(56) References Cited

U.S. PATENT DOCUMENTS

| 3,902,333 | A | * | 9/1975 | Dossier | 464/73 |
| 4,335,586 | A | * | 6/1982 | Kochendorfer et al. | 464/93 |
| 4,744,783 | A | | 5/1988 | Downey et al. | |
| 5,176,575 | A | * | 1/1993 | McCullough | 464/99 |
| 5,928,083 | A | * | 7/1999 | Monahan et al. | 464/93 |
| 6,440,000 | B1 | | 8/2002 | Asa | |
| 7,699,709 | B2 | * | 4/2010 | Kubota et al. | 464/73 |
| 7,883,423 | B2 | * | 2/2011 | Kubota et al. | 464/73 |

(Continued)

FOREIGN PATENT DOCUMENTS

| GB | 2126690 | 3/1984 |
| JP | 45-4409 | 2/1970 |

(Continued)

OTHER PUBLICATIONS

International Search Report for PCT/JP2010/007291 mailed Mar. 1, 2011.

(Continued)

*Primary Examiner* — Gregory Binda
*Assistant Examiner* — Josh Skroupa
(74) *Attorney, Agent, or Firm* — Nixon & Vanderhye P.C.

(57) ABSTRACT

A shaft coupling mechanism for an electric power steering apparatus includes a coupling base body coupled to a rotating shaft on a side of an electric motor; a coupling base body coupled to a steering shaft; rotation transmitting members interposed between both coupling base bodies and adapted to transmit the rotation of the rotating shaft in an R direction to the steering shaft through both coupling base bodies; an intermediate interposed member interposed between the coupling base bodies; and a coupling means for coupling the rotation transmitting members to each other.

2 Claims, 6 Drawing Sheets

(56) References Cited

U.S. PATENT DOCUMENTS

| | | |
|---|---|---|
| 2008/0035414 A1 | 2/2008 | Kubota et al. |
| 2008/0128195 A1 | 6/2008 | Kubota et al. |

FOREIGN PATENT DOCUMENTS

| | | |
|---|---|---|
| JP | 2002-518242 | 6/2002 |
| JP | 2004-148990 | 5/2004 |
| JP | 2004-149070 | 5/2004 |
| JP | 2006-177505 | 7/2006 |
| JP | 2008-183676 | 7/2006 |
| JP | 2007-145269 | 6/2007 |
| WO | WO 2008/129821 A1 | 10/2008 |

OTHER PUBLICATIONS

Parent, U.S. Appl. No. 13/518,968, filed Jun. 25, 2012.
European Search Report issued in corresponding European Patent Application No. 14194131.0 dated Mar. 13, 2015.

* cited by examiner (a)　　　　　　　(b)

SHAFT COUPLING MECHANISM

This application is a divisional of U.S. application Ser. No. 13/518,968, filed on Jun. 25, 2012, now U.S. Pat. No. 8,616, 986, which is a U.S. national phase of International Application No. PCT/JP2010/007291 filed Dec. 15, 2010 which designated the U.S. and claims priority to JP 2009-296416 filed Dec. 25, 2009, the entire contents of each of which are hereby incorporated by reference.

TECHNICAL FIELD

The present invention relates to a shaft coupling mechanism suitable for coupling a rotating shaft on a rotating source side such as an electric motor in an electric power steering apparatus and a rotating shaft on an operating side such as a steering shaft of an automobile.

BACKGROUND ART

An electric power steering apparatus, for example, is for facilitating the manual steering of a steering wheel by adding a torque based on the rotation of an output rotating shaft of an electric motor to a torque based on the rotation of the steering wheel which is manually operated. In such an electric power steering apparatus, the steering shaft on the steering wheel side and the rotating shaft on the output rotating shaft side of the electric motor are coupled by means of a shaft coupling mechanism (a coupling).

In the case where the steering shaft and the rotating shaft are coupled by means of the shaft coupling mechanism, there is a possibility that an impact at the time of the reversing of the output rotating shaft of the electric motor and the vibration of the brushes of the electric motor are transmitted to the steering wheel through the shaft coupling mechanism and the steering shaft, thereby causing an unpleasant steering feel to the driver. To avoid this, it has been proposed to provide a spacer made of such as rubber or soft resin for the shaft coupling mechanism. However, if the spacer is made softer by placing emphasis on the reduction of the impact and vibration, since the soft spacer is likely to undergo creep deformation, backlash can occur in the shaft coupling mechanism owing to the permanent deformation of the spacer due to the repeated load on the spacer. There is a possibility that this can also make the driver's steering feel unpleasant. On the other hand, if the spacer is made hard by placing emphasis on the durability, the steering feel improves contrary to the above since there is no backlash. However, the steering feel becomes uncomfortable due to the impact and vibration transmitted to the steering wheel, as described above.

Accordingly, there has also been proposed a shaft coupling mechanism for an electric steering apparatus which is comprised of a pair of rotation transmitting members, an intermediate interposed member which is interposed between this pair of rotation transmitting members and is elastically deformable, one coupling base body which is coupled to one rotating shaft, and another coupling base body which is coupled to another rotating shaft. This proposed shall coupling mechanism is one in which, even if it is used over a long-term period, backlash in the rotating direction is difficult to occur between one rotating shaft, e.g., a rotating shaft coupled to the output rotating shaft of the electric motor, and another rotating shaft, e.g., the steering shaft coupled to the steering wheel, which makes it possible to reduce the transmission to the steering wheel of the impact at the time of the reversing of the electric motor and the brush vibration, and which hence excels in durability and prevents the steering feel from becoming uncomfortable (refer to Patent Document 4).

PRIOR ART DOCUMENTS

Patent Documents

Patent document 1: JP-T-2002-518242
Patent document 2: JP-A-2004-148990
Patent document 3: JP-A-2004-149070
Patent document 4: JP-A-2006-183676

SUMMARY OF THE INVENTION

Problems that the Invention is to Solve

Incidentally, with such a proposed shaft coupling mechanism, each of the coupling base bodies has a base portion and projecting portions projecting integrally in an axial direction from one axial surface of this base portion, with the result that there is a possibility that, in the axial relative displacement of one rotating shaft with respect to the other rotating shaft, the projecting portions of each coupling base body are pressed against and brought into contact with the base portion of the mating coupling base body, and therefore collision noise can occur due to this pressing and contact. Furthermore, there is a possibility that if such an axial relative displacement occurs in the transmission of the rotation of one rotating shaft to the other rotating shaft, frictional noise can occur due to the pressing and contact. Furthermore, because the axial relative approach and displacement of one rotating shaft with respect to the other rotating shaft cannot be absorbed, there is a possibility that it is impossible to reduce the transmission to the steering wheel of the brush vibration which causes axial relative displacement of one rotating shaft with respect to the other rotating shaft by causing axial elastic compressive deformation in radial projecting portions of the intermediate interposed member.

If the axial length of the projecting portion of each coupling base body is made short in order to avoid such pressing and contact, the contact area in the direction about the axis of the projecting portion of each coupling base body with respect to the intermediate interposed member becomes small, in which case each rotation transmitting member can be abnormally deformed and the intermediate interposed member is subjected to excessive elastic compressive deformation, thereby possibly causing deterioration in the durability.

The present invention has been devised in view of the above-described problems, and its object is to provide a shaft coupling mechanism which makes it possible to eliminate the occurrence of collision noise in the axial relative displacement of one rotating shaft with respect to the other rotating shaft and does not generate unpleasant frictional noise in the transmission of the rotation of one rotating shaft to the other rotating shaft, and which makes it possible to secure, as desired, a contact area in the direction about the axis of the projecting portion of each coupling base body with respect to each rotation transmitting member or the intermediate interposed member, and to avoid excessive elastic compressive deformation of the intermediate interposed member interposed between the coupling base bodies, thereby suppressing deterioration in the durability.

Means for Solving the Problems

A shaft coupling mechanism in accordance with the present invention for coupling two rotating shafts by being disposed between the two rotating shafts so as to transmit the rotation of one rotating shaft to the other rotating shaft, comprises: one coupling base body which is coupled to one rotating shaft, another coupling base body which is coupled to another rotating shaft, a pair of rotation transmitting members which are disposed between the one and the other coupling base bodies, and an intermediate interposed member which is interposed between the pair of rotation transmitting members, wherein each of the one and the other coupling base bodies has a first base portion and a first axial projecting portion formed integrally with the first base portion in such a manner as to project in an axial direction from one axial surface of the first base portion, the first axial projecting portion of the one coupling base body and the first axial projecting portion of the other coupling base body are disposed with an interval therebetween in a direction about an axis, and each of the pair of rotation transmitting members has a second base portion interposed between the first base portions of the one and the other coupling base bodies in the axial direction, at least a pair of first radial projecting portions formed integrally on the second base portion in such a manner as to be spaced apart from each other in the axial direction and project radially from an outer peripheral edge of the second base portion, and a through hole formed in a center of the second base portion, the pair of first radial projecting portions of one of the pair of rotation transmitting members and the pair of first radial projecting portions of another one of the pair of rotation transmitting members facing each other in the axial direction, wherein the intermediate interposed member has a third base portion interposed between the second base portions of the pair of rotation transmitting members in the axial direction, a pair of second radial projecting portions which are integrally formed on the third base portion in such a manner as to project radially from an outer peripheral edge of the third base portion and to be spaced apart from each other in the direction about the axis, are each disposed between the pair of first radial projecting portions of the pair of rotation transmitting members in the axial direction, and each have a greater width in the direction about the axis than a width of each of the pair of first radial projecting portions, a second axial projecting portion which is integrally formed on the third base portion in such a manner as to project in the axial direction from one axial surface of the third base portion and is passed through the through hole of one of the second base portions, and a third axial projecting portion which is integrally formed on the third base portion in such a manner as to project in the axial direction from another axial surface of the third base portion and is passed through the through hole of another one of the second base portions, wherein each of the pair of second radial projecting portions of the intermediate interposed member having a smaller rigidity than the rigidity of the first axial projecting portion and the first radial projecting portion and being elastically deformable, at least one of the one rotating shaft and the first base portion of the one coupling base body at its one axial surface being in contact with an axial surface of the second axial projecting portion, while at least one of the other rotating shaft and the first base portion of the other coupling base body at its one axial surface being in contact with an axial surface of the third axial projecting portion, and wherein the first axial projecting portion of the one coupling base body is disposed in one second radial projecting portion gap in the direction about the axis, is in contact with both one side surface in the direction about the axis of one second radial projecting portion and another side surface in the direction about the axis of another second radial projecting portion at its both side surfaces in the direction about the axis, extends across and beyond one axial surface of the other rotation transmitting member, and, at its axial distal end surface, opposes the one axial surface of the first base portion of the other coupling base body with a clearance therebetween, while the first axial projecting portion of the other coupling base body is disposed in another second radial projecting portion gap in the direction about the axis, is in contact with both another side surface in the direction about the axis of the one second radial projecting portion and one side surface in the direction about the axis of the other second radial projecting portion at its both side surfaces in the direction about the axis, extends across and beyond one axial surface of the one rotation transmitting member, and, at its axial distal end surface, opposes the one axial surface of the first base portion of the one coupling base body with a clearance therebetween.

According to the shaft coupling mechanism in accordance with the present invention, at least one of the first base portion of the one coupling base body and the other rotating shaft at its one axial surface is in contact with an axial surface of the second axial projecting portion, while at least one of the first base portion of the other coupling base body and the other rotating shaft at its one axial surface is in contact with an axial surface of the third axial projecting portion. Further, the first axial projecting portion of the one coupling base body extends across and beyond one axial surface of the other rotation transmitting member, and, at its axial distal end surface, opposes the one axial surface of the first base portion of the other coupling base body with a clearance therebetween, while the first axial projecting portion of the other coupling base body extends across and beyond the one axial surface of the one rotation transmitting member, and, at its axial distal end surface, opposes the one axial surface of the first base portion of the one coupling base body with a clearance therebetween. Therefore, it is possible to avoid contact between the distal end surface of the axial projecting portion of the one coupling base body and the one axial surface of the base portion of the other coupling base body and contact between the distal end surface of the axial projecting portion of the other coupling base body and the one axial surface of the base portion of the one coupling base body. Furthermore, it is possible to allow the axial projecting portions of the one and the other coupling base bodies to be brought into contact with overall surfaces of the radial projecting portions of the pair of rotation transmitting members in the direction about the axis. Additionally, it is possible to eliminate the occurrence of collision noise in the relative axial displacement of the one rotating shaft with respect to the other rotating shaft, and unpleasant frictional noise is not generated in the transmission of the rotation of the one rotating shaft to the other rotating shaft. Furthermore, it is possible to secure, as desired, a contact area in the direction about the axis of the axial projecting portion of each coupling base body with respect to the radial projecting portion of each rotation transmitting member, and to avoid excessive elastic compressive deformation of the intermediate interposed member, thereby making it possible to improve the durability.

In a preferred example, each of the pair of rotation transmitting members further has a protruding portion which is integrally formed on one axial surface of the second base portion and discontinuously or continuously surrounds the second axial projecting portion projecting from the through hole.

According to the shaft coupling mechanism having the above-described protruding portion, even if the second and third axial projecting portions have undergone large elastic compressive deformation or permanent set, and the proper function of the second and third axial projecting portions has thereby been lost, the function of the second and third axial projecting portions can be substituted for by the protruding portion.

In the present invention, the pair of rotation transmitting members are preferably formed of a hard resin such as polyacetal resin, polyamide resin, or the like, but may be formed of another hard resin exhibiting rigidity, and the intermediate interposed member may be formed of a rubber elastomer such as urethane rubber, polyester elastomer, or the like.

The shaft coupling mechanism in a preferred example of the present invention may further have a coupling means for coupling the pair of rotation transmitting members to each other. The coupling means may have a pawl portion which is integrally provided on the second base portion of the one rotation transmitting member in such a manner as to project from an inner peripheral edge of the other axial surface of the second base portion of the one rotation transmitting member toward the second base portion of the other rotation transmitting member, and which is latched at its distal end by an inner peripheral edge of the second base portion of the other rotation transmitting member, and well as a pawl portion which is integrally provided on the second base portion of the other rotation transmitting member in such a manner as to project from an inner peripheral edge of the other axial surface of the second base portion of the other rotation transmitting member toward the second base portion of the one rotation transmitting member, and which is latched at its distal end by an inner peripheral edge of the second base portion of the one rotation transmitting member. In this case, the intermediate interposed member having the third base portion may have in the third base portion through holes through which both claw portions of the coupling means are respectively passed through.

If the intermediate interposed member is positioned with respect to the pair of rotation transmitting members by both claw portions of the coupling means through such through holes, the effect derived from the intermediate interposed member can be obtained uniformly with respect to the relative rotation in both directions of the two rotating shafts.

With the shaft coupling mechanism in accordance with the present invention, in order to ensure that free play does not occur in the relative initial rotation of one rotating shaft with respect to the other rotating shaft, in the relative rotation by a fixed degree or less of both rotating shafts, each of the first axial projecting portions of the one and the other coupling base bodies at its side surfaces in the direction about the axis may be in contact with side surfaces in the direction about the axis of each second radial projecting portion of the intermediate interposed member opposing the same in the direction about the axis. Meanwhile, each of the first axial projecting portions of the one and the other coupling base bodies at its side surfaces in the direction about the axis may be in noncontact with, in the relative rotation by a fixed degree or less of both rotating shafts, and may be adapted to be brought into contact with, in the relative rotation by more than a fixed degree of both rotating shafts, side surfaces in the direction about the axis of the first radial projecting portions of the pair of rotation transmitting members opposing the same in the axial direction. The one coupling base body may be directly coupled and secured to the one rotating shaft, but may be indirectly coupled to the one rotating shaft through another rotation transmitting mechanism such as a gear mechanism, and the same also applies to the other coupling base body as well.

The shaft coupling mechanism in accordance with the present invention may be a shaft coupling mechanism for an electric power steering apparatus, in which case the one rotating shaft may be adapted to be coupled to an output rotating shaft of an electric motor, while the other rotating shaft may be adapted to be coupled to a steering shaft of an automobile.

Advantages of the Invention

According to the present invention, it is possible to provide a shaft coupling mechanism which makes it possible to eliminate the occurrence of collision noise in the axial relative displacement of one rotating shaft with respect to the other rotating shaft and does not generate unpleasant frictional noise in the transmission of the rotation of one rotating shaft to the other rotating shaft, and which makes it possible to secure, as desired, a contact area in the direction about the axis of the projecting portion of each coupling base body with respect to each rotation transmitting member, and to avoid excessive elastic compressive deformation of the intermediate interposed member interposed between the coupling base bodies, thereby suppressing deterioration in the durability.

MODE FOR CARRYING OUT THE INVENTION

Figure 1:
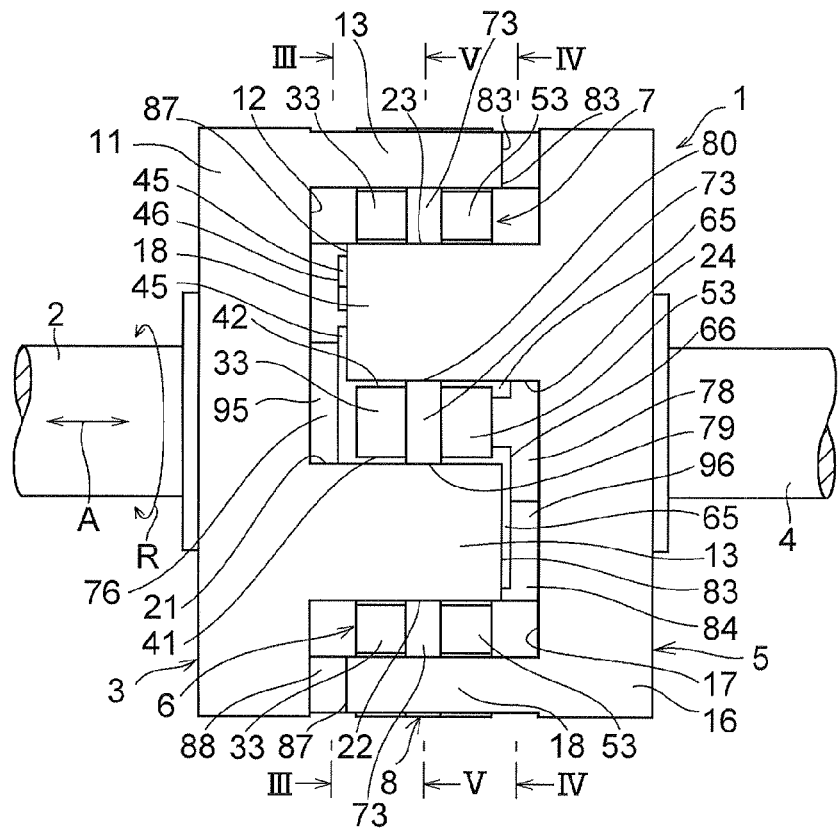
FIG. 1 is an explanatory front elevational view of a preferred embodiment of the invention.
Figure 2:
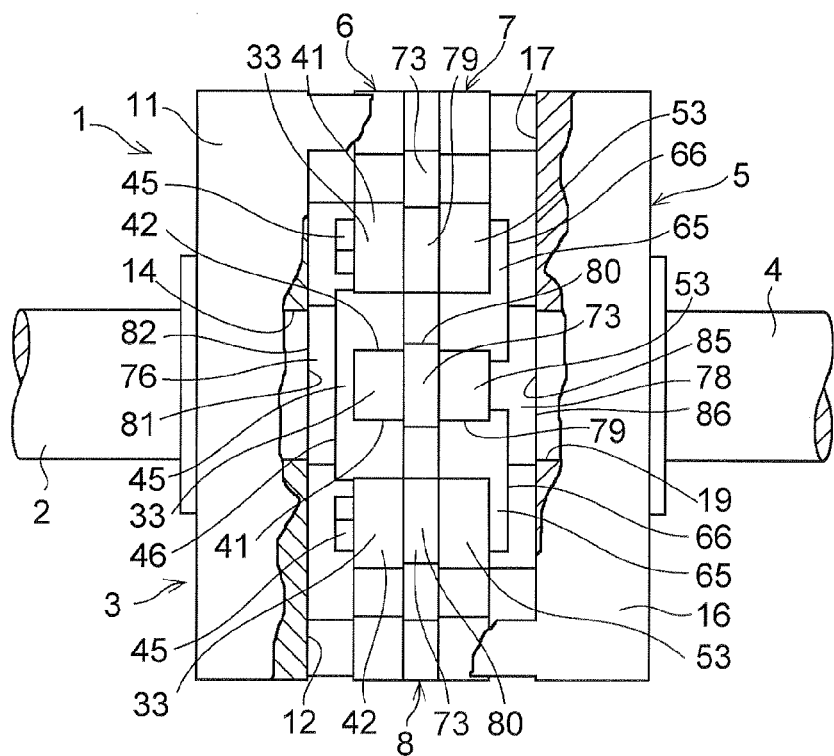
FIG. 2 is an explanatory partially cutaway front elevational view of the embodiment shown in FIG. 1.
Figure 3:
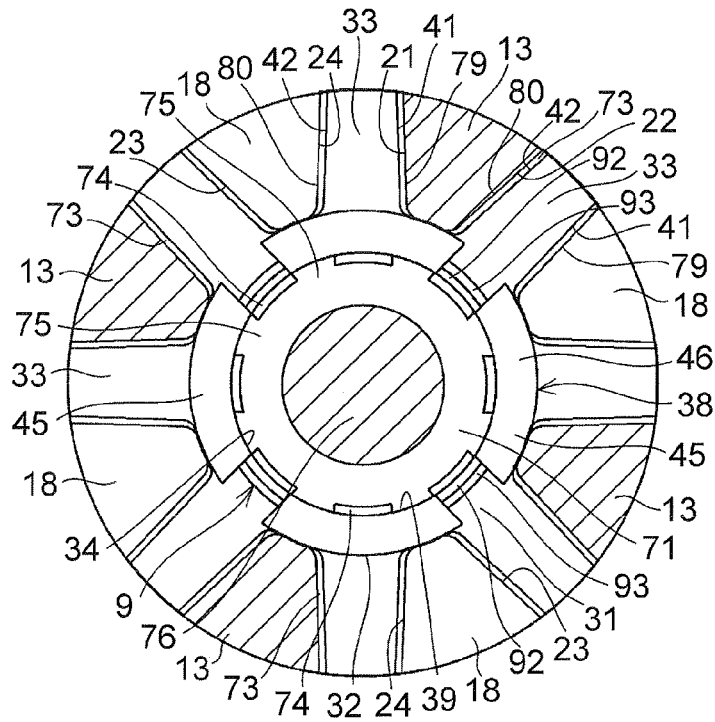
FIG. 3 is an explanatory cross-sectional view, taken in the direction of arrows along line III-III, of the embodiment shown in FIG. 1.
Figure 4:
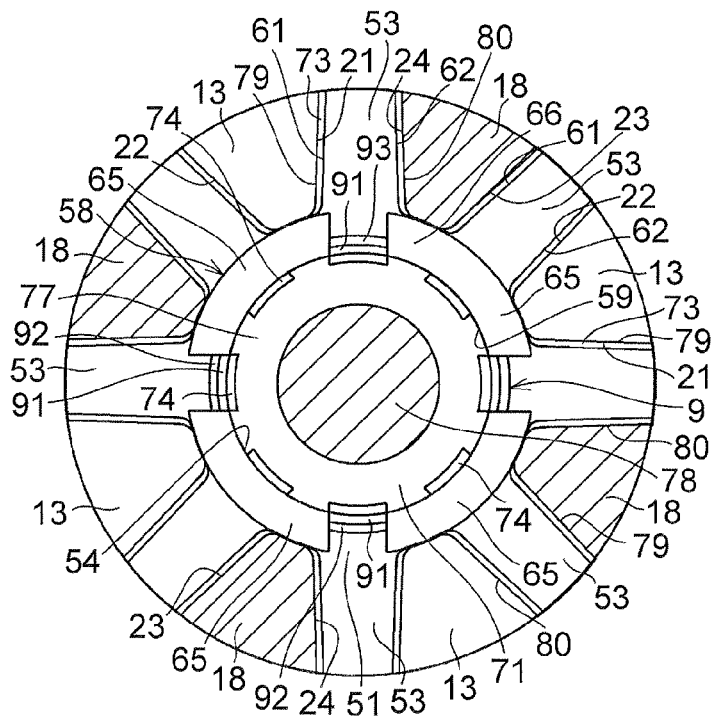
FIG. 4 is an explanatory cross-sectional view, taken in the direction of arrows along line IV-IV, of the embodiment shown in FIG. 1.
Figure 5:
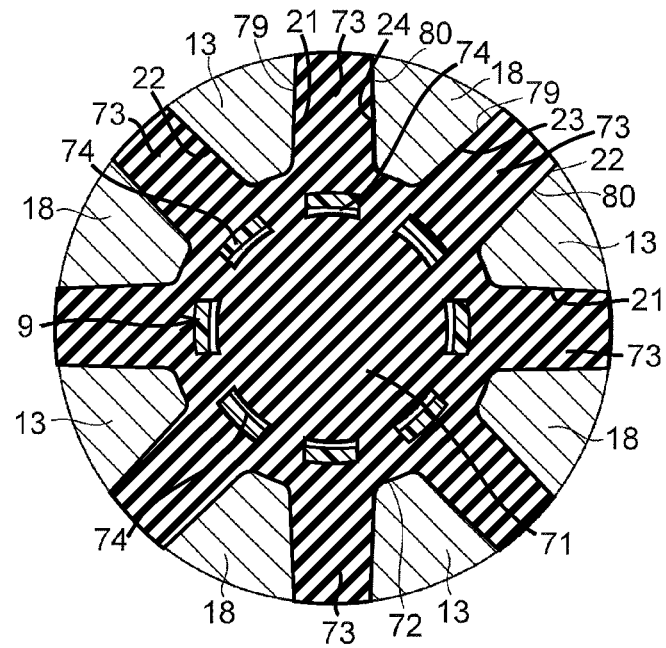
FIG. 5 is an explanatory cross-sectional view, taken in the direction of arrows along line V-V, of the embodiment shown in FIG. 1.

Next, a more detailed description will be given of the mode of carrying out the invention on the basis of a preferred embodiment illustrated in the drawings. It should be noted that the present invention is not limited to this embodiment.

In FIGS. 1 to 5, a shaft coupling mechanism 1 for an electric power steering apparatus in accordance with this embodiment is comprised of a coupling base body 3 coupled to a rotating shaft 2 on an electric motor side of an electric power steering apparatus; a coupling base body 5 coupled to a steering shaft 4 serving as a rotating shaft; a pair of rotation transmitting members 6 and 7 interposed between both coupling base bodies 3 and 5 and adapted to transmit the rotation of the rotating shaft 2 in an R direction to the steering shaft 4 through both coupling base bodies 3 and 5; an intermediate interposed member 8 interposed between both coupling base bodies 3 and 5; and a coupling means 9 for coupling the pair of rotation transmitting members 6 and 7 to each other.

Figure 6:
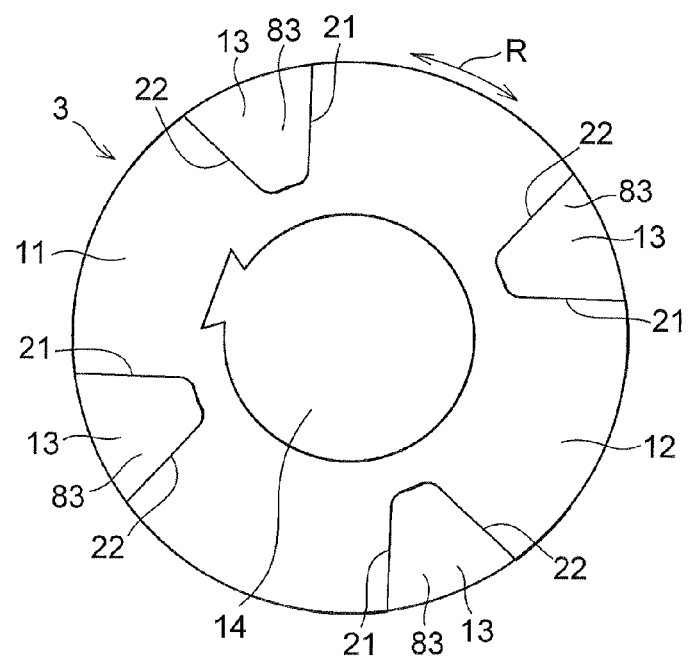
FIG. 6 is an explanatory right side view of a coupling base body on a rotating shaft side of the embodiment shown in FIG. 1.

As particularly shown in FIG. 6, the coupling base body 3 which is rigid includes an annular base portion 11; two pairs of axial projecting portions 13 which project integrally from one annular surface 12 in an axial direction, i.e., an A direction, of the base portion 11 toward a base portion 16 of the coupling base body 5 in the A direction and are arranged at equiangular intervals of 90° in the direction about the axis, i.e., in the R direction; and a through hole 14 formed in the center of the base portion 11.

The rotating shaft 2 may be fitted and secured to the base portion 11 in the through hole 14 in which the rotating shaft 2 is inserted as in this embodiment. However, the rotating shaft 2 may be fitted and secured to the base portion 11 in a bottomed recess which is formed in the center of the base portion 11, or may, still alternately, be integrally formed with the base portion 11.

Figure 7:
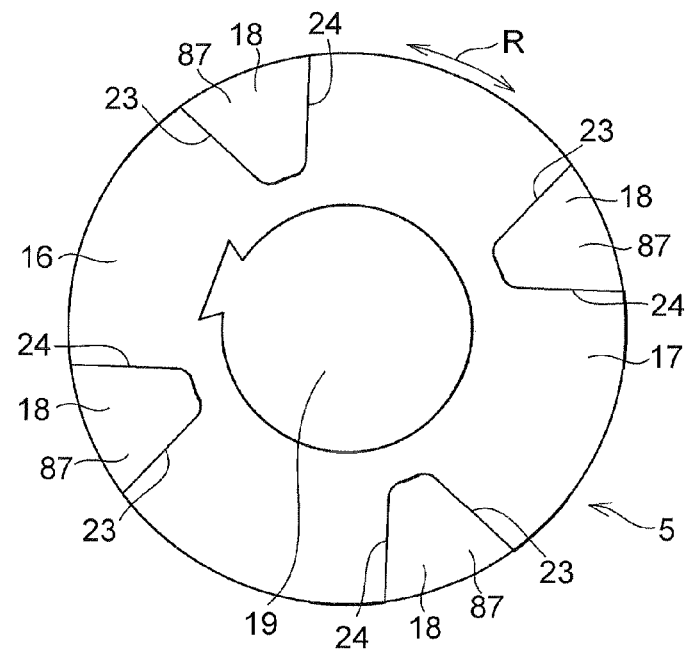
FIG. 7 is a an explanatory left side view of a coupling base body on a steering shaft side of the embodiment shown in FIG. 1.

As particularly shown in FIG. 7, the coupling base body 5 which is rigid is formed in the same way as the coupling base body 3 and includes the annular base portion 16; two pairs of axial projecting portions 18 which project integrally from one annular surface 17 in the A direction of the base portion 16 toward the base portion 11 of the coupling base body 3 in the A direction and are arranged at equiangular intervals of 90° in the R direction; and a through hole 19 formed in the center of the base portion 16.

The steering shaft 4 may also be fitted and secured to the base portion 16 in the through hole 19 in which the steering shaft 4 is inserted as in this embodiment. However, the steering shaft 4 may be fitted and secured to the base portion 16 in a bottomed recess which is formed in the center of the base portion 16, or may, still alternately, be integrally formed with the base portion 16.

Each of the axial projecting portions 13 has in the R direction a pair of flat side surfaces 21 and 22 serving as rotation transmitting rigid surfaces, and each of the axial projecting portions 18 also has in the R direction a pair of flat side surfaces 23 and 24 serving as rotation transmitting rigid surfaces.

Figure 9:
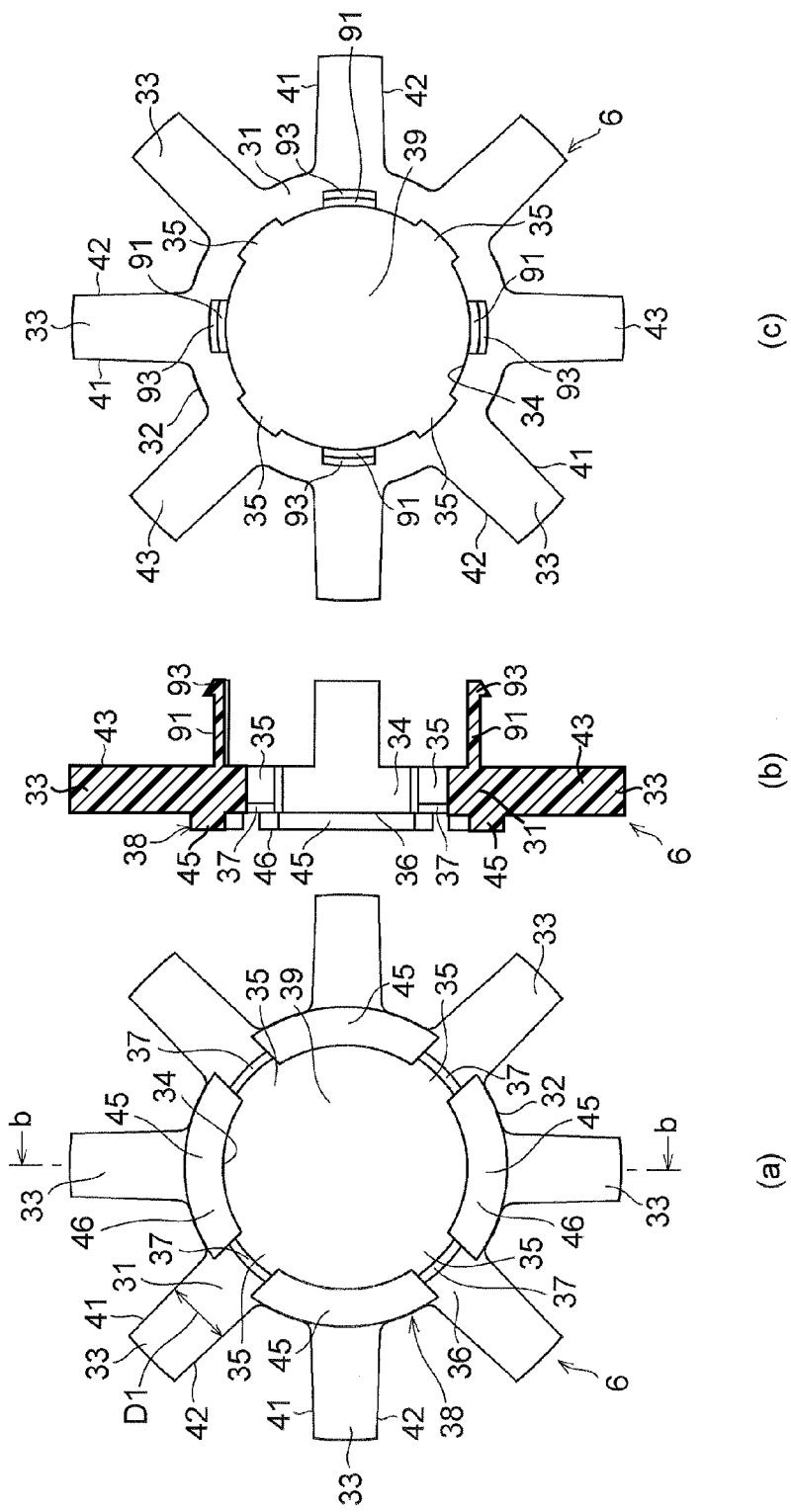
FIG. 9 is an explanatory diagram of a rotation transmitting member on the rotating shaft side of the embodiment shown in FIG. 1, in which part (a) is a left side view, part (b) is a cross-sectional view taken in the direction of arrows along line b-b in part (a), and part (c) is a right side view.

As particularly shown in FIG. 9, the rigid rotation transmitting member 6, which is integrally formed of polyacetal resin, polyamide resin, or the like, includes an annular base portion 31 interposed between the base portions 11 and 16 in the A direction and disposed concentrically with the base portions 11 and 16; four pairs of radial projecting portions 33 which are provided integrally with the base portion 31 in such a manner as to extend radially from a cylindrical outer peripheral edge 32 of the base portion 31 and are arranged in such a manner as to be spaced apart from each other at equiangular intervals of 45° in the R direction; four grooves 35 formed at a cylindrical inner peripheral edge 34 of the base portion 31 in such a manner as to extend in the A direction and to be spaced apart from each other at equiangular intervals of 90° in the R direction; four retaining grooves 37 which are respectively connected to respective one ends of the grooves 35 and are formed at the inner peripheral edge 34 of the base portion 31, specifically on one annular surface 36 in the A direction of the base portion 31 opposing the surface 12; a protruding portion 38 formed integrally on the surface 36 in such a manner as to project from the surface 36 in the A direction toward the surface 12; and a through hole 39 defined by the inner peripheral edge 34 and formed in the center of the base portion 31.

Each of the radial projecting portions 33 has a pair of side surfaces 41 and 42 serving as rigid rotation transmitting surfaces in the R direction, and surfaces 43 of the radial projecting portions 33 opposing the intermediate interposed member 8 are flush with each other and flat, preferably intermediately high in the R direction.

The protruding portion 38 is constituted by four circular arc-shaped protrusions 45 which protrudingly extend in the R direction and are formed in a concentric circle in such a manner as to be spaced apart from each other at equiangular intervals of 90° in the R direction, and end faces 46 in the A direction of the protrusions 45 are flat and flush with each other.

Figure 10:
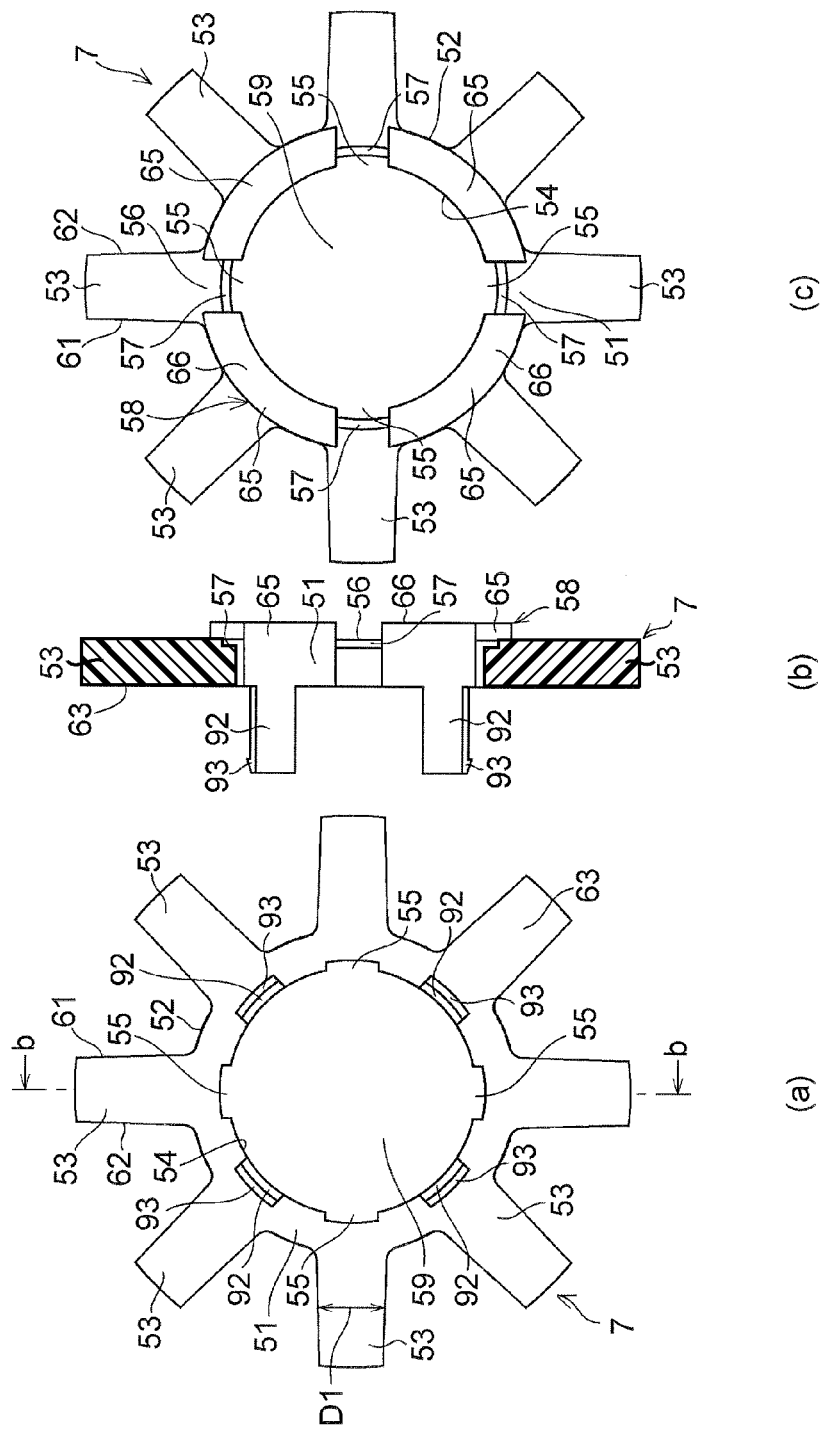
FIG. 10 is an explanatory diagram of a rotation transmitting member on the steering shaft side of the embodiment shown in FIG. 1, in which part (a) is a left side view, part (b) is a cross-sectional view taken in the direction of arrows along line b-b in part (a), and part (c) is a right side view.

As particularly shown in FIG. 10, the rigid rotation transmitting member 7, which is integrally formed of polyacetal resin, polyamide resin, or the like in the same way as the rotation transmitting member 6, is constructed in the same way as the rotation transmitting member 6 and includes an annular base portion 51 interposed between the base portions 11 and 16 in the A direction and disposed concentrically with the base portions 11 and 16; four pairs of radial projecting portions 53 which are provided integrally with the base portion 51 in such a manner as to extend radially from a cylindrical outer peripheral edge 52 of the base portion 51 and are arranged in such a manner as to be spaced apart from each other at equiangular intervals of 45° in the R direction; four grooves 55 formed at a cylindrical inner peripheral edge 54 of the base portion 51 in such a manner as to extend in the A direction and to be spaced apart from each other at equiangular intervals of 90° in the R direction; four retaining grooves 57 which are respectively connected to respective one ends of the grooves 55 and are formed at the inner peripheral edge 54 of the bb 51, specifically on one annular surface 56 in the A direction of the base portion 51 opposing the surface 17; a protruding portion 58 formed integrally on the surface 56 in such a manner as to project from the surface 56 in the A direction toward the surface 17; and a through hole 59 defined by the inner peripheral edge 54 and formed in the center of the base portion 51.

Each of the radial projecting portions 53 has a pair of side surfaces 61 and 62 serving as rigid rotation transmitting surfaces in the R direction, and surfaces 63 of the radial projecting portions 53 opposing the intermediate interposed member 8 are flush with each other and flat, preferably intermediately high in the R direction.

The protruding portion 58 is constituted by four circular arc-shaped protrusions 65 which projectingly extend in the R direction and are formed in a circular arrangement in such a manner as to be spaced apart from each other at equiangular intervals of 90° in the R direction, and end faces 66 in the A direction of the protrusions 65 are flat and flush with each other.

The rotation transmitting member 6 and the rotation transmitting member 7 are arranged concentrically such that the base portion 31 and the base portion 51, as well as the respective radial projecting portions 33 and the respective radial projecting portions 53, face each other in the A direction with the intermediate interposed member 8 interposed therebetween.

Figure 8:
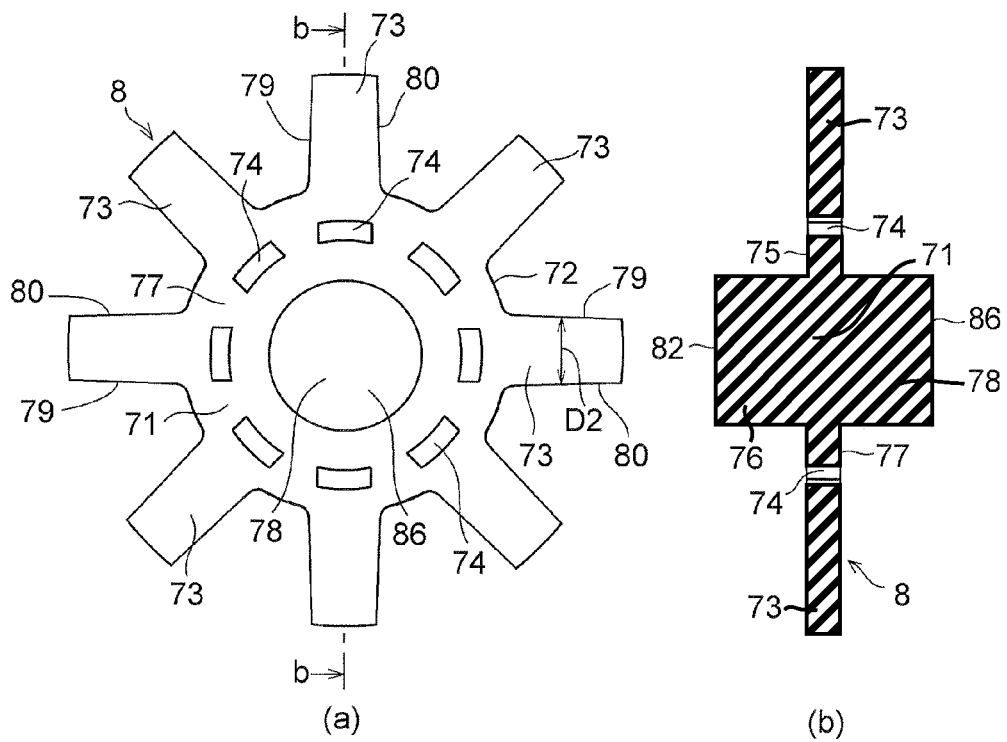
FIG. 8 is an explanatory diagram of an intermediate interposed member of the embodiment shown in FIG. 1, in which part (a) is a right side view, and part (b) is a cross-sectional view taken in the direction of arrows along line b-b in part (a)

The intermediate interposed member 8 has a smaller rigidity than the rotation transmitting members 6 and 7, is elastically deformable, and is formed of a rubber elastic body such as urethane rubber, polyester elastomer, or the like. As particularly shown in FIG. 8, the intermediate interposed member 8 includes a disk-shaped base portion 71 interposed between the base portions 31 and 51 in the A direction concentrically with the base portions 31 and 51; four pairs of radial projecting portions 73 which are provided integrally with the base portion 71 in such a manner as to extend radially from a cylindrical outer peripheral edge 72 of the base portion 71 and are arranged in such a manner as to be spaced apart from each other at equiangular intervals of 45° in the R direction; eight circular arc-shaped through holes 74 formed in the base portion 71 and formed concentrically in such a manner as to be spaced apart from each other at equiangular intervals of 45° in the R direction; an axial projecting portion 76 which is formed integrally with the base portion 71 in such a manner as to project in the A direction from one flat surface 75 in the A direction of the base portion 71, and is passed through the through hole 39 formed in the center of the base portion 31; and an axial projecting portion 78 which is formed integrally with the base portion 71 in such a manner as to project in the A direction from the other flat surface 77 in the A direction of the base portion 71, and is passed through the through hole 59 formed in the center of the base portion 51. The intermediate interposed member 8 is disposed such that the base portion 71 and the radial projecting portions 73 are respectively sandwiched by the radial projecting portions 33 and 53 and by the base portions 31 and 51 in the A direction in close contact therewith. The axial projecting portion 76 and the axial projecting portion 78 in this embodiment have a mutually identical height in the A direction, but may not be limited to the same, and may have mutually different heights in the A direction.

Each of the radial projecting portions 73 of the intermediate interposed member 8 has a smaller rigidity than that of each of the radial projecting portions 33 and 53 of the rotation transmitting members 6 and 7, and is elastically deformable. Each of the radial projecting portions 73, which has side surfaces 79 and 80 in the R direction, is disposed between the corresponding radial projecting portions 33 and 53 of the rotation transmitting members 6 and 7 in the A direction in close contact therewith, and is formed with a larger width D2 in the R direction than a width D1 of each of the radial projecting portions 33 and 53.

The rotation transmitting members 6 and 7 and the intermediate interposed member 8 interposed between the rotation transmitting members 6 and 7 are arranged concentrically such that the base portions 31 and 51 and the base portion 71, as well as the respective radial projecting portions 33 and 53 and the respective radial projecting portions 73, face each other in the A direction in close contact therewith.

Each of the rotating shaft 2 and the base portion 11 of the coupling base body 3 is in contact with a surface 82 in the A direction of the axial projecting portion 76 at each of their surfaces 12 and 81 in the A direction. Each of the axial projecting portions 13 of the coupling base body 3 is disposed in every other gap between adjacent ones of the radial projecting portions 33 and 53 of the rotation transmitting members 6 and 7 in the R direction and in every other gap of adjacent ones of the radial projecting portions 73 of the intermediate interposed member 8 in the R direction, is in contact with both one side surface 79 in the R direction of one radial projecting portion 73 and the other side surface 80 in the R direction of another radial projecting portion 73 at its both side surfaces 21 and 22 in the R direction, extends across and beyond the surface 56 of the rotation transmitting member 7, and, at its distal end surface 83 in the A direction, opposes the surface 17 of the base portion 16 of the coupling base body 5 with a clearance 84 therebetween.

Each of the steering shaft 4 and the base portion 16 of the coupling base body is in contact with a surface 86 in the A direction of the axial projecting portion 78 at each of their surfaces 17 and 85 in the A direction. Each of the axial projecting portions 18 of the coupling base body 5 is disposed in every other remaining gap between adjacent ones of the radial projecting portions 33 and 53 of the rotation transmitting members 6 and 7 in the R direction and in every other remaining gap between adjacent ones of the radial projecting portions 73 of the intermediate interposed member 8 in the R direction, is in contact with both the other side surface 24 in the R direction of the one radial projecting portion 73 and the one side surface 79 in the R direction of the other radial projecting portion 73 at its both side surfaces 23 and 24 in the R direction, extends across and beyond the surface 36 of the rotation transmitting member 6, and, at its distal end surface 87 in the A direction, opposes the surface 12 of the base portion 11 of the coupling base body 3 with a clearance 88 therebetween.

The coupling means 9 has four pawl portions 91 which are integrally provided on the base portion 31 in such a manner as to projectingly extend from the inner peripheral edge 34 of the rotation transmitting member 6 toward the base portion 51 of the rotation transmitting member 7, are each passed through every other through hole 74 and groove 55, and are each latched at its distal end by the inner peripheral edge 54 of the base portion 51 of the rotation transmitting member 7 in its retaining groove 57; and pawl portions 92 which are integrally provided on the base portion 51 in such a manner as to projectingly extend from the inner peripheral edge 54 of the rotation transmitting member 7 toward the base portion 31 of the rotation transmitting member 6, are each passed through every other remaining through hole 74 and groove 35, and are each latched at its distal end by the inner peripheral edge 34 of the base portion 31 of the rotation transmitting member 6 in its retaining groove 37. The pawl portions 91 and 92, which are arranged in such a manner as to be spaced apart from each other at equiangular angles in the R direction, each have a hook portion 93 at their distal ends, and are latched at the hook portion 93 by the inner peripheral edge 54 in the retaining groove 57 and by the inner peripheral edge 34 in the retaining groove 37, respectively. The rotation transmitting members 6 and 7 are coupled to each other with the intermediate interposed member 8 interposed therebetween by means of such a coupling means 9.

With respect to the intermediate interposed member 8 and the rotation transmitting members 6 and 7 coupled to each other with the intermediate interposed member 8 interposed therebetween by the coupling means 9, each of the axial projecting portions 13 of the coupling base body 3 is disposed in one gap between adjacent ones of the radial projecting portions 33 and 53 among the respective pairs of projecting portions 33 and 53 of the rotation transmitting members 6 and 7, i.e., in every other gap between adjacent ones of the radial projecting portions 33 and 53, as well as in one gap between adjacent ones of the radial projecting portions 73 among the respective pairs of projecting portions 73 of the intermediate interposed member 8, i.e., in every other gap between adjacent ones of the radial projecting portions 73, in the R direction. Meanwhile, each of the axial projecting portions 18 of the coupling base body 5 is disposed in another gap between adjacent ones of the radial projecting portions 33 and 53 among the respective pairs of projecting portions 33 and 53 of the rotation transmitting members 6 and 7, i.e., in every other remaining gap between adjacent ones of the radial projecting portions 33 and 53, as well as in another gap between adjacent ones of the radial projecting portions 73 among the respective pairs of projecting portions 73 of the intermediate interposed member 8, i.e., in every other remaining gap between adjacent ones of the radial projecting portions 73, in the R direction. In the relative rotation by a fixed degree or less in the R direction between the rotating shaft 2 and the steering shaft 4, each of the axial projecting portions 13 of the coupling base body 3 at its side surfaces 21 and 22 in the R direction is in contact with the side surfaces 79 and 80 in the R direction of each projecting portion 73 of the intermediate interposed member 8, but is in non-contact with the side surfaces 41 and 42 as well as 61 and 62 of the radial projecting portions 33 and 53 of the rotation transmitting members 6 and 7 opposing them in the R direction. Meanwhile, each of the axial projecting portions 18 of the coupling base body 5 at its side surfaces 23 and 24 in the R direction is in contact with the side surfaces 79 and 80 in the R direction of each projecting portion 73 of the intermediate interposed member 8, but is in non-contact with the side surfaces 41 and 42 as well as 61 and 62 of the radial projecting portions 33 and 53 of the rotation transmitting members 6 and 7 opposing them in the R direction.

The protruding portion 38, which is constituted by the protrusions 45 discontinuously surrounding the axial projecting portion 76 projecting from the through hole 39, has a shorter length in the A direction (amount of projection) than the amount of projection of the axial projecting portion 76 from the through hole 39, and forms a clearance 95, which is smaller than the corresponding clearance 88, between their end faces 46 in the A direction and the surface 12. Similarly, the protruding portion 58, which is constituted by the protrusions 65 discontinuously surrounding the axial projecting portion 78 projecting from the through hole 59, has a shorter length in the A direction (amount of projection) than the amount of projection of the axial projecting portion 78 from the through hole 59, and forms a clearance 96, which is smaller than the corresponding clearance 84, between their end faces 66 in the A direction and the surface 17.

With the electric power steering apparatus equipped with the above-described shaft coupling mechanism 1 for mutually coupling the rotating shaft 2 and the steering shaft 4, which are two rotating shafts, when the steering wheel is manually operated by the driver, the steering shaft 4 is rotated in the R direction, and the rotation of the steering shaft 4 in the R direction is transmitted to a drag link and the like as reciprocating motion through an unillustrated transmission mechanism such as gears, thereby imparting a steering force for steering control wheels (wheels). In the manual operation of the steering wheel by the driver, when the electric motor which is controlled by a detection signal from a torque detector for detecting the torque applied to the steering wheel is operated, the rotating shaft 2 is rotated in the R direction. The rotation of the coupling base body 3 in the R direction is then transmitted to the axial projecting portions 18 of the coupling base body 5 through the pressing against the radial projecting portions 33 and 53 by the axial projecting portions 13 on the basis of the contact of the side surfaces 21 with the side surfaces 41 and 61 or the contact of the side surfaces 22 with the side surfaces 42 and 62 after the elastic deformation in the R direction of the radial projecting portions 73 by the axial projecting portions 13. As a result, the torque of the rotating shaft 2 in the R direction is added to the torque of the steering shaft 4 in the R direction, thereby assisting the manual operation of the steering wheel by the driver.

With the shaft coupling mechanism 1 which couples the rotating shaft 2 and the steering shaft 4 by being disposed between the rotating shaft 2 and the steering shaft 4 so as to transmit the rotation of the rotating shaft 2 in the R direction to the steering shaft 4 which is the other rotating shaft, in both the state in which the steering wheel is not manually operated by the driver and the steering shaft 4 is not rotated in the R direction and the state in which the steering wheel is manually operated by the driver and the steering shaft 4 is rotated in the R direction, in a case where the relative rotation of the rotating shaft 2 in the R direction with respect to the steering shaft 4 is of such a very small degree as to fall within less than about half a difference between the width D2 and the width D1, the radial projecting portions 73 easily undergo compressive deformation. As a result, such a very small relative rotation of the rotating shaft 2 in the R direction is almost not transmitted to the steering shaft 4. Thus, it is possible to reduce the transmission to the steering wheel of the impact at the time of the reversing of the electric motor and the brush vibration through the shaft coupling mechanism 1 and the steering shaft 4, thereby making it possible to prevent the steering feel from becoming uncomfortable. Moreover, after the compressive deformation of the radial projecting portions 73 by more than a fixed degree, the contact of the side surfaces 21 with the side surfaces 41 and 61 or the contact of the side surfaces 22 with the side surfaces 42 and 62 occur, which makes it possible to suppress any further elastic compressive deformation of the radial projecting portions 73. As a result, it is possible to prevent the permanent set of the radial projecting portions 73 due to their creep. Hence, it is possible to maintain over extended periods of time the mutual contact between, on the one hand, the side surfaces 21 and 22 as well as 23 and 24 and, on the other hand, the side surfaces 79 and 80 in the R direction of the axial projecting portions 13 and 18 and the radial projecting portions 73, and therefore backlash is made difficult to occur between the steering shaft 4 and the rotating shaft 2 in the R direction.

Further, in cases where the steering shaft 4 is rotated in the R direction by the manual operation of the steering wheel by the driver, followed by the rotation of the rotating shaft 2 in the R direction by the operation of the electric motor, and the rotating shaft 2 tends to be relatively rotated in the R direction with respect to the steering shaft 4 by more than a fixed degree, i.e., by more than about a half the difference between the width D2 and the width D1, the rotation transmitting members 6 and 7 transmit the rotation of the rotating shaft 2 in the R direction to the steering shaft 4 in response to such relative rotation in the R direction by more than a fixed degree through the pressing against the radial projecting portions 33 and 53 by the axial projecting portions 13 on the basis of the contact of the side surfaces 21 with the side surfaces 41 and 61 or the contact of the side surfaces 22 with the side surfaces 42 and 62, so as to assist the rotation of the steering shaft 4.

According to the above-described shaft coupling mechanism 1, each of the rotating shaft 2 and the base portion 11 of the coupling base body 3 is in contact with the surface 82 in the A direction of the axial projecting portion 76 at each of their surfaces 12 and 81 in the A direction which are arranged flush with each other. Each of the steering shaft 4 and the base portion 16 of the coupling base body 5 is in contact with the surface 86 in the A direction of the axial projecting portion 78 at each of their surfaces 17 and 85 in the A direction which are arranged flush with each other. Each of the axial projecting portions 13 of the coupling base body 3 extends across and beyond the surface 56 of the rotation transmitting member 7, and, at its distal end surface 83 in the A direction, opposes the surface 17 of the base portion 16 of the coupling base body 5 with the clearance 84 therebetween. Each of the axial projecting portions 18 of the coupling base body 5 extends across and beyond the surface 36 of the rotation transmitting member 6, and, at its distal end surface 87 in the A direction, opposes the surface 12 of the base portion 11 of the coupling base body 3 with the clearance 88 therebetween. Therefore, it is possible to avoid contact between, on the one hand, the distal end surfaces 83 of the axial projecting portions 13 of the coupling base body 3 and, on the other hand, the surface 17 of the base portion 16 of the coupling base body 5 and contact between, on the one hand, the distal end surfaces 87 of the axial projecting portions 18 of the coupling base body 5 and, on the other hand, the surface 12 of the base portion 11 of the coupling base body 3. Furthermore, it is possible to allow the axial projecting portions 13 and 18 of the coupling base bodies 3 and 5 to be brought into contact with overall surfaces in the R direction of the radial projecting portions 33 and 53 of the rotation transmitting members 6 and 7. Additionally, it is possible to eliminate the occurrence of collision noise in the relative displacement in the A direction of the rotating shaft 2 with respect to the steering shaft 4, and unpleasant frictional noise is not generated in the transmission of the rotation in the R direction of the rotating shaft 2 to the steering shaft 4. Furthermore, it is possible to secure, as desired, the contact area in the R direction of each of the axial projecting portions 13 and 18 of the coupling base bodies 3 and 5 with respect to the radial projecting portions 33 and 53 of the rotation transmitting members 6 and 7, and to avoid excessive elastic compressive deformation of the intermediate interposed member 8, thereby making it possible to improve the durability.

In addition, according to the shaft coupling mechanism 1, since the rotation transmitting members 6 and 7 respectively have the protruding portions 38 and 58 which are integrally formed on the surfaces 36 and 56 of their base portions 31 and 51, even if the axial projecting portions 76 and 78 have undergone large elastic compressive deformation or permanent set, and the proper function of the axial projecting portions 76 and 78 has thereby been lost, the function of the axial projecting portions 76 and 78 can be substituted for by the contact of the protruding portions 38 and 58 with respect to the surfaces 12 and 17.

Furthermore, according to the shaft coupling mechanism 1, the intermediate interposed member 8 interposed between the rotation transmitting members 6 and 7 in the A direction has the radial projecting portions 73 which are respectively disposed between the radial projecting portions 33 and 53 of the rotation transmitting members 6 and 7 in the A direction and each have the greater width D2 than the width D1 in the R direction of each of the radial projecting portions 33 and 53, and each radial projecting portion 73 of the intermediate interposed member 8 has a smaller rigidity than the rigidity of each of the radial projecting portions 33 and 53 of the rotation transmitting members 6 and 7. In consequence, the transmission of the rotation of the rotating shaft 2 in the R direction to the steering shaft 4 is effected through the elastic deformation of the radial projecting portions 73 of the intermediate interposed member 8, so that the transmission of a very small degree of rotation of the rotating shaft 2 in the R direction to the steering shaft 4 can be reduced or prevented by the elastic deformation of the radial projecting portions 73 of the intermediate interposed member 8. Meanwhile, the transmission to the steering shaft 4 of a large degree of relative rotation of the rotating shaft 2 in the R direction with respect to the steering shaft 4 can be can be effected as it is through the radial projecting portions 33 and 53 of the rotation transmitting members 6 and 7 having grater rigidity than the radial projecting portions 73 of the intermediate interposed member 8. Moreover, in the relative rotation of the rotating shaft 2 by more than a fixed degree in the R direction with respect to the steering shaft 4, large elastic deformation of the radial projecting portions 73 of the intermediate interposed member 8 can be prevented by the radial projecting portions 33 and 53 of the rotation transmitting members 6 and 7 having greater rigidity; therefore, even if a pliable resin material having a small rigidity is used for the intermediate interposed member 8, permanent set of the intermediate interposed member 8 due to creep can be reduced. Moreover, since the pair of rotation transmitting members 6 and 7 are coupled to each other through the coupling means 9, it is possible to improve assembling efficiency, and the mutual separation of the pair of rotation transmitting members 6 and 7 in the A direction due to the elastic deformation of the intermediate interposed member 8 can be eliminated, making it possible to suppress the pair of rotation transmitting members 6 and 7 from spreading in the A direction by more than a fixed extent. Thus, it is possible to reduce the transmission to the steering wheel of the impact at the time of the reversing of the electric motor and the brush vibration and eliminate backlash between the rotating shaft 2 and the steering shaft 4 in the R direction, thereby making it possible to prevent the steering feel from becoming uncomfortable and obtain excellent durability and stable characteristics.

In addition, according to the shaft coupling mechanism 1, since the intermediate interposed member 8 is positioned in the R direction with respect to the pair of rotation transmitting members 6 and 7 by means of both pawl portions 91 and 92 of the coupling means 9 which are passed through the through holes 74, the effect derived from the intermediate interposed member 8 can be obtained uniformly with respect to the relative rotation in both R directions of the rotating shaft 2 and the steering shaft 4.

Although the shaft coupling mechanism 1 in the above-described embodiment is comprised of a single intermediate interposed member 8, the shaft coupling mechanism 1 may alternatively be comprised of two or more intermediate interposed members 8, and each of the rotation transmitting members 6 and 7 may be constituted by two or more rotation transmitting members. Also, the numbers of the axial projecting portions 13 and 18 of the coupling base bodies 3 and 5, the radial projecting portions 33 and 53 of the rotation transmitting members 6 and 7, the radial projecting portions 73 of the intermediate interposed member 8, and the pawl portions 91 and 92 of the coupling means 9 are not limited to the aforementioned numbers. The surface 12 of the base portion 11 and the surface 81 of the rotating shaft 2 may not be flush with each other, and the surface 17 of the base portion 16 and the surface 85 of the steering shaft 4 may similarly not be flush with each other

DESCRIPTION OF REFERENCE NUMERALS

1: shaft coupling mechanism
2: rotating shaft
3: coupling base body
4: steering shaft
5: coupling base body
6, 7: rotation transmitting member
8: intermediate interposed member

The invention claimed is:

1. A shaft coupling mechanism comprising: a first coupling base body for coupling with a first rotating shaft, a second coupling base body for coupling with a second rotating shaft, a pair of rotation transmitting members disposed between said first and second coupling base bodies, and an intermediate interposed member interposed between said pair of rotation transmitting members, for transmitting the rotation of the first coupling base body based on the rotation of the first rotating shaft to the second rotating shaft by means of the rotation of the second coupling base body based on said rotation of the first coupling base body in such a manner as to produce a resilient deformation of the intermediate interposed member before the second coupling base body is rotated based on the rotation of the first coupling base body by means of said pair of rotation transmitting members, wherein each of said first and second coupling base bodies has a first base portion and a first axial projecting portion axially projecting from the first base portion, and each of said pair of rotation transmitting members has a second base portion interposed between the first base portions in the axial direction and having a through hole in a center of the second base portion, wherein said intermediate interposed member has a third base portion interposed between the second base portions in the axial direction, a second axial projecting portion disposed on and projecting axially from a center portion of the third base portion and passing through the through hole of one of the second base portions, and a third axial projecting portion disposed on and projecting axially from the center portion of the third base portion and passing through the through hole of another one of the second base portions, at least one of the first rotating shaft and the first base portion of said first coupling base body being adapted to be in contact with an axial surface of the second axial projecting portion, while at least one of the second rotating shaft and the first base portion of said second coupling base body being adapted to be in contact with an axial surface of the third axial projecting portion, and wherein a distal end surface of the first axial projecting portion of said first coupling base body opposes an axial surface of the first base portion of said second coupling base body with a clearance therebetween, while a distal end surface of the first axial projecting portion of said second coupling base body opposes an axial surface of the first base portion of said first coupling base body with a clearance therebetween.

2. The shaft coupling mechanism according to claim 1, wherein one of said pair of rotation transmitting members further has a first protruding portion projecting from one axial surface of the second base portion thereof, and another one of said pair of rotation transmitting members further has a second protruding portion projecting from one axial surface of the second base portion thereof.

* * * * *